C. W. LOUDON.
PROTECTIVE ARMOR FOR PNEUMATIC TIRES.
APPLICATION FILED OCT. 31, 1921.
1,418,661.
Patented June 6, 1922.
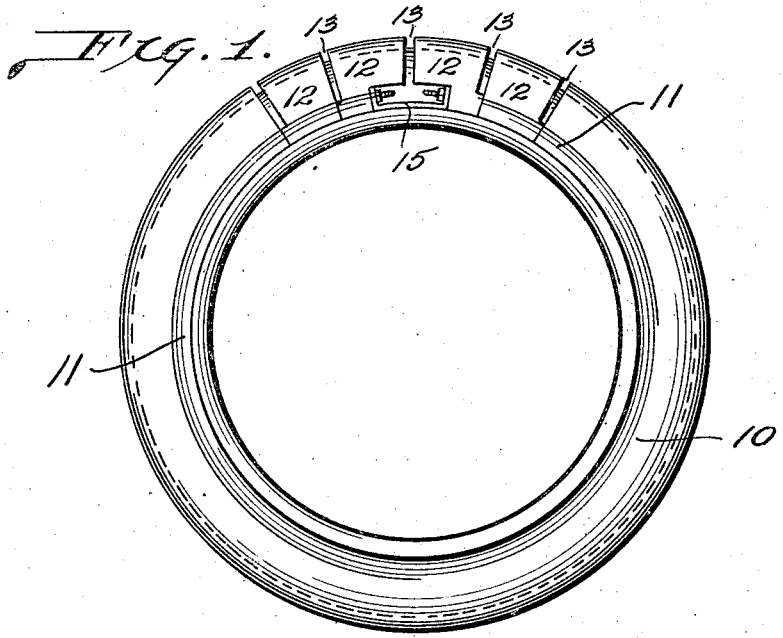
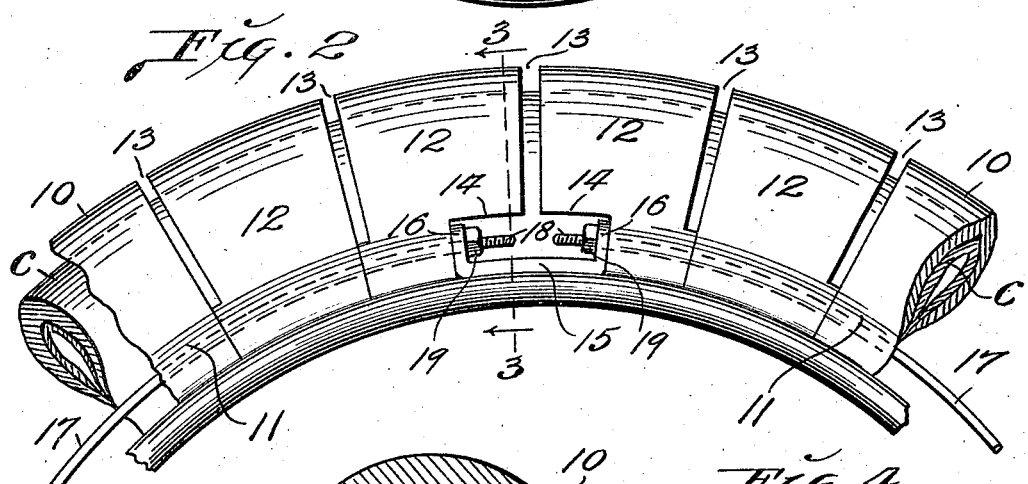
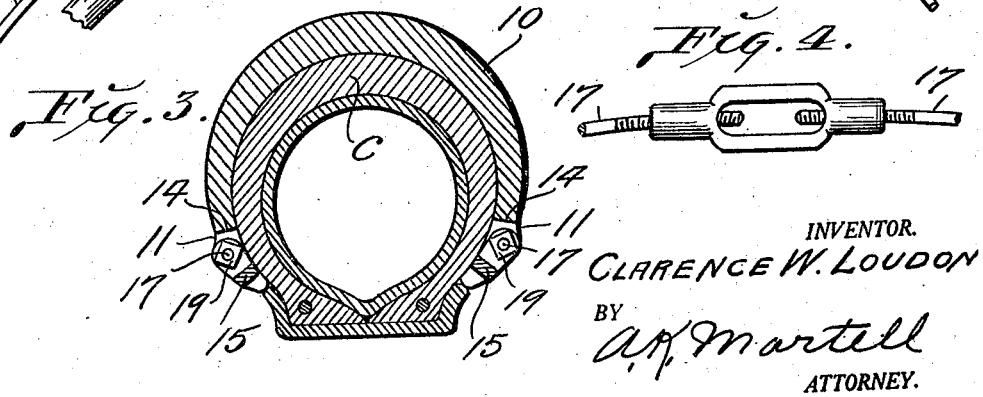
INVENTOR.
CLARENCE W. LOUDON
BY
A. K. Martell
ATTORNEY.

UNITED STATES PATENT OFFICE.

CLARENCE W. LOUDON, OF HUNTINGTON PARK, CALIFORNIA.

PROTECTIVE ARMOR FOR PNEUMATIC TIRES.

1,418,661.  Specification of Letters Patent.  Patented June 6, 1922.

Application filed October 31, 1921. Serial No. 511,553.

*To all whom it may concern:*

Be it known that I, CLARENCE W. LOUDON, a citizen of the United States, residing at Huntington Park, in the county of Los Angeles and State of California, have invented new and useful Improvements in Protective Armor for Pneumatic Tires, of which the following is a specification.

My invention relates to a protective armor for pneumatic tires, the principal objects of my invention being to provide a relatively simple, strong and durable protective covering that may be easily and cheaply produced, readily applied to or removed from a pneumatic tire and which covering provides an over-size tire, reduces to a minimum the possibilities of puncture and blowouts and materially increases the tractive effect of the tire.

Further objects of my invention are to construct the protective member so that overheating of said member and the tire to which it is applied is prevented, and further to utilize used or partially worn casings in the formation of the protective member.

With the foregoing and other objects in view, my invention consists in certain novel features of construction and arrangement of parts that will be hereinafter more fully described and claimed and illustrated in the accompanying drawings in which:

Fig. 1 is an elevational view of a pneumatic tire with a protective member of my improved construction applied thereto.

Fig. 2 is an enlarged elevational view of a portion of the tire protecting member.

Fig. 3 is an enlarged cross section taken on the line 3—3 of Fig. 2.

Fig. 4 is an elevational view of a turn buckle that may be used for contracting my improved tire protecting device.

In the construction of the armor or protective member, I utilize a used or partially worn pneumatic tire casing 10, and after cutting the same across or transversely, the usual wires are removed from the bead portions 11 of said casing. Short segmental sections such as 12 are now cut from the body of the casing adjacent to the point where the first transverse cut was made and a portion of one end of each segment is cut away between the beads so that when the segments are properly assembled, relatively narrow spaces 13 are formed between the adjacent ends of said segments.

Such construction permits air to be drawn into and forced out of the joint between the protective member and the casing of the tire to which it is applied and consequently preventing the entire structure from becoming unduly heated while in service.

The bead portions of the segments to the sides of the first transverse cut are cut away to form notches or recesses 14 that accommodate short plates 15, having upwardly bent ends 16 and the latter being perforated in order to receive the end portions of wires 17 that are threaded through the circumferential holes in the beads 11 that were occupied by the removed wires.

The ends of these wires are threaded as designated by 18 in order to receive nuts 19 that bear directly against the ends 16 of plates 15.

The armor or protective member thus constructed is fitted directly onto the casing C of a pneumatic tire and by screwing the nuts 19 onto the threaded ends of the wires 17 the armor may be contracted circumferentially so that it fits snugly upon the enclosed casing.

When properly applied for use the armor covers practically all parts of the casing to which it applied, thereby preventing said casing from being worn as a result of contact with the ground or pavement, and in addition the armor materially reinforces and strengthens the enclosed casing and minimizes the possibility of punctures and blowouts.

When applied to a casing the protective covering co-operates with said casing in producing an over-size tire and consequently increasing the tractive effect of the tire and at the same time decreasing the tendency of the tire to skid on slippery surfaces.

If desired, a turn buckle of the form illustrated in Fig. 4 may be utilized between the ends of the wires 17 instead of the plates 15 and nuts 19. Thus it will be seen that I have provided a pneumatic tire armor that is capable of being easily and cheaply produced and which possesses superior advantages in point of simplicity, strength, durability and general efficiency.

Various changes in the size, form and construction of the different parts of my improved tire armor may be made and substituted for those herein shown and described without departing from the spirit of the invention as set forth in the appended claim.

I claim as my invention:

A protective covering for a pneumatic tire, comprising a casing that includes a relatively long segmental member and a series of relatively short segments; portions of the ends of said short segments being spaced apart; the inner lower corners of the members of an adjacent pair of said short segments being cut away; wires extending through the bead portions of said casing, the ends of which wires terminate within the cut away corners of the pair of segments, and means connecting the ends of the wires within said cut away corners for drawing said wires together and contracting the casing and segments.

CLARENCE W. LOUDON.